US011582152B2

(12) United States Patent
Chandrashekar et al.

(10) Patent No.: US 11,582,152 B2
(45) Date of Patent: Feb. 14, 2023

(54) METHOD AND SYSTEM FOR DATA MANAGEMENT IN AN EDGE SERVER

(71) Applicant: HEWLETT PACKARD ENTERPRISE DEVELOPMENT, Houston, TX (US)

(72) Inventors: Charan Acharya Chandrashekar, Bangalore (IN); Aneesh George, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 104 days.

(21) Appl. No.: 17/158,171

(22) Filed: Jan. 26, 2021

(65) Prior Publication Data

US 2021/0234799 A1 Jul. 29, 2021

(30) Foreign Application Priority Data

Jan. 29, 2020 (IN) .............................. 202041003939

(51) Int. Cl.
*H04L 12/801* (2013.01)
*H04L 12/835* (2013.01)
*H04L 47/12* (2022.01)
*H04L 47/30* (2022.01)

(52) U.S. Cl.
CPC .............. *H04L 47/12* (2013.01); *H04L 47/30* (2013.01)

(58) Field of Classification Search
CPC ................................ H04L 47/12; H04L 47/30
See application file for complete search history.

(56) References Cited

U.S. PATENT DOCUMENTS

| 2014/0359131 | A1* | 12/2014 | Seed | H04L 67/1031 |
| | | | | 709/226 |
| 2016/0323143 | A1* | 11/2016 | Kim | G06F 3/0629 |
| 2017/0255498 | A1* | 9/2017 | King-Smith | G06F 9/5083 |
| 2018/0306609 | A1* | 10/2018 | Agarwal | G01D 5/00 |
| 2018/0368068 | A1* | 12/2018 | Deorah | H04W 64/003 |
| 2019/0104173 | A1* | 4/2019 | Yamazaki | G06F 9/505 |
| 2019/0132384 | A1* | 5/2019 | Ishii | H04L 67/1031 |
| 2019/0138356 | A1* | 5/2019 | Bernat | H04L 63/0464 |
| 2019/0319868 | A1* | 10/2019 | Svennebring | H04L 41/147 |
| 2020/0178198 | A1* | 6/2020 | Ding | H04W 60/04 |
| 2021/0337425 | A1* | 10/2021 | Wintner | H04L 67/125 |

* cited by examiner

*Primary Examiner* — Huy D Vu
*Assistant Examiner* — Bailor C Hsu
(74) *Attorney, Agent, or Firm* — Hewlett Packard Enterprise Patent Department

(57) ABSTRACT

Example implementations relate to method and system for data management in a computing system, such as an edge server having a processing resource. During operation, the processing resource collects data from a plurality of smart devices and process a portion of the data at each edge-stage of a plurality of first edge-stages to generate partially processed data. Further, the processing resource evaluates a data processing load at an edge-stage of the plurality of first edge-stages based on a throughput of the edge-stage or a size of a data processing queue of a next edge-stage of the plurality of first edge-stages. The processing resource further pushes the partially processed data to the next edge-stage or a portion of the partially processed data to an external computing system and a remaining portion of the partially processed data to the next edge-stage, based on the data processing load at the edge-stage.

20 Claims, 9 Drawing Sheets

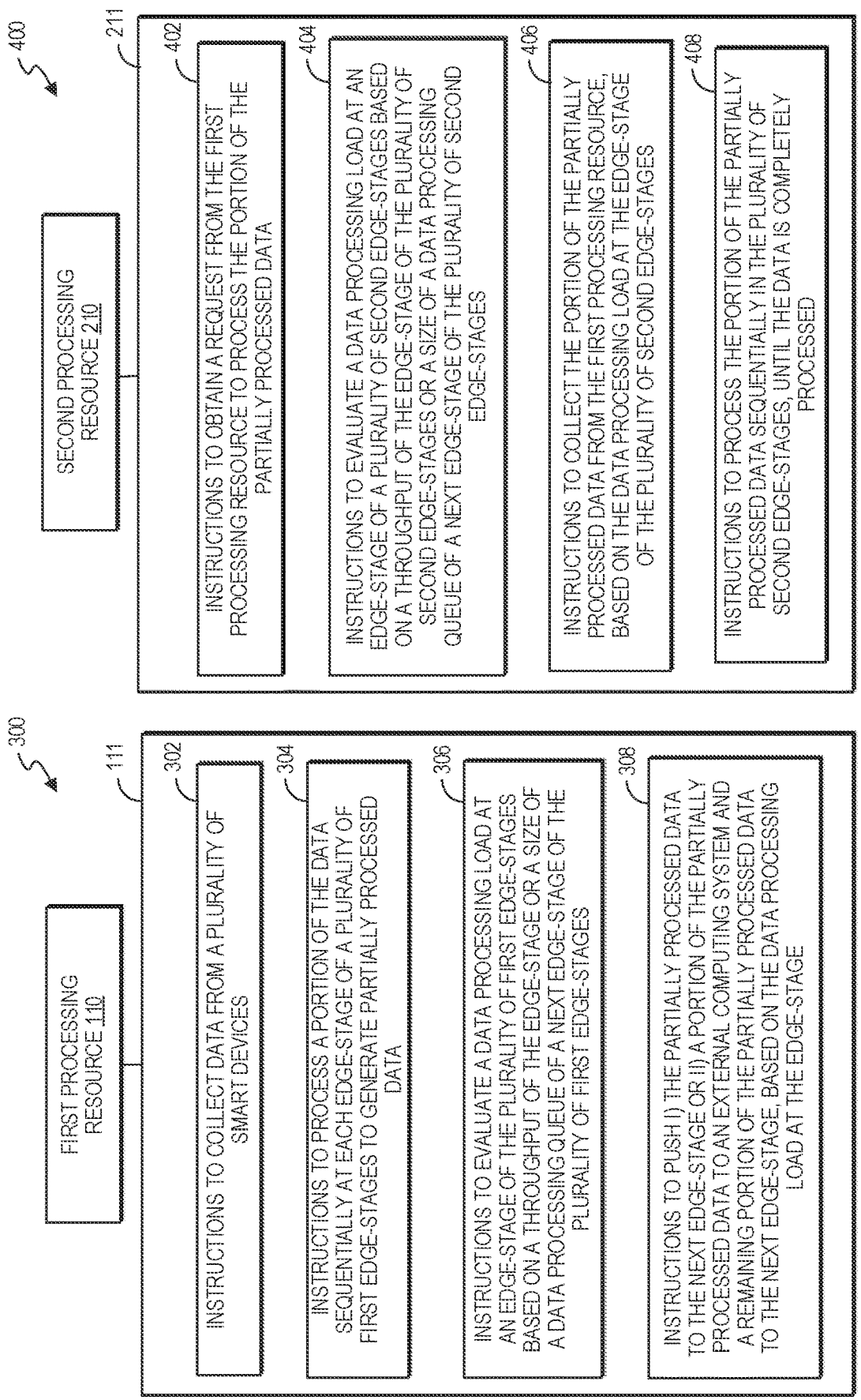

METHOD AND SYSTEM FOR DATA MANAGEMENT IN AN EDGE SERVER

BACKGROUND

The use of smart devices, for example, Internet of Things ("IoT") devices is increasing at a rapid pace, with a corresponding increase in the amount of data being processed by these devices. Processing of data from the IoT devices may involve sending data from the IoT devices to an edge server communicatively coupled to the IoT devices, and then to a server(s) on a cloud network communicatively coupled to the edge server. Processing of data from the IoT devices may incur network and computation latency issues.

BRIEF DESCRIPTION OF THE DRAWINGS

Various examples will be described below with reference to the following figures.

FIG. 4A is a block diagram depicting a first processing resource and a first machine readable medium encoded with example instructions to process data in a first computing system.

FIG. 4B is a block diagram depicting a second processing resource and a second machine readable medium encoded with example instructions to process data in a second computing system.

DETAILED DESCRIPTION

Figure 1:
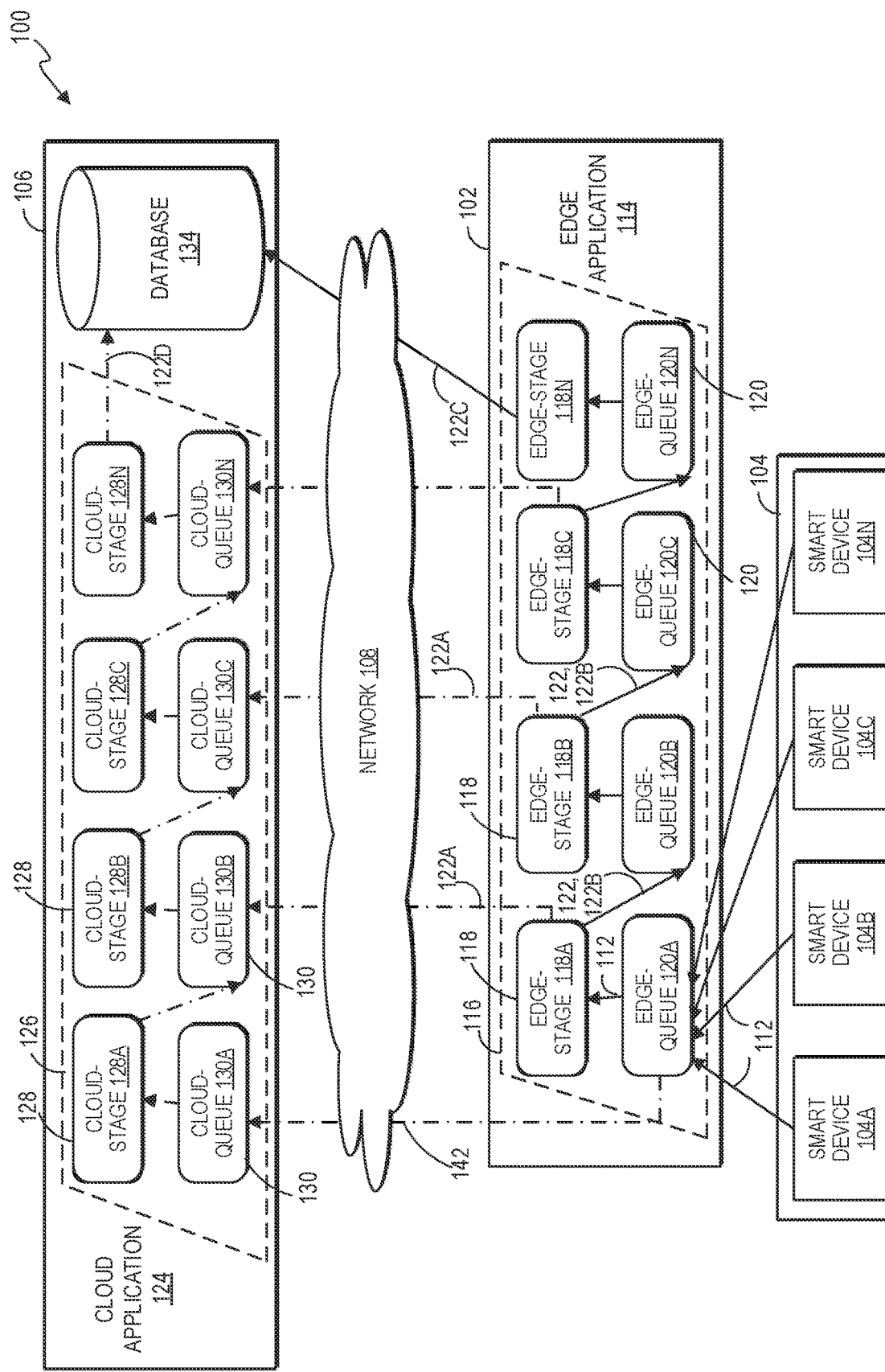
FIG. 1 is a block diagram depicting an example environment in which various examples may be implemented as a system that facilitates processing of IoT data using a first computing system.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements may be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

The foregoing disclosure describes a number of example implementations for management of data generated by a plurality of smart devices. The disclosed examples may include systems, devices, computer-readable storage media, and methods for processing the data generated by the plurality of IoT devices. For purposes of explanation, certain examples are described with reference to the components illustrated in FIGS. 1-9. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5-9 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. All such modifications and variations are intended to be included within the scope of this disclosure and protected by the following claims.

The use of IoT devices is increasing at a rapid pace, with a corresponding increase in the amount of data being processed by these devices. Processing of data generated from IoT devices may involve sending data from the IoT devices to an edge server (or device) communicatively coupled to the IoT devices, and then to a server(s) on a cloud network communicatively coupled to the edge server. Processing of data from the IoT devices may incur both network and computation latency issues. Generally, the edge server allows the data generated by the IoT devices to be processed closer to where it is created instead of sending it across long routes to the server(s) in the cloud network. Thereby, the edge server may increase the performance of the IoT devices by combatting both network and computation latency issues associated with transferring and processing the data respectively. However, at times the edge server may also end up having the computational latency issue, when the rate at which data produced by the IoT devices are higher than the rate at which data is consumed or processed by an edge application. In such scenarios, the edge server might choke, if the data production rate continues to increase and shoots over a threshold value. It should be noted herein that the term "choke" refers a condition of the edge server, at which data cannot be either consumed or processed by the edge application. Thus, the computational latency in the edge server is directly proportional to the rate at which data can be consumed or processed in the edge application over the rate at which data is produced by the IoT devices.

Of note is the increase in video feeds from the IoT devices. Video feeds, and other data with similarly high payloads may be timely and costly to process. For example, IoT cameras are able to generate large amounts of visual data every second. Due to their geographical location, offloading the entire set of data captured by the IoT cameras to the edge server and then to the server(s) in the cloud network may not be possible and/or may incur significant delays, in addition to incurring a significant bandwidth cost. Reducing the resolution for transfer of data is also not ideal, as it makes the processing and analysis of that data more difficult. Existing solutions to process the data generated from the IoT devices are either built into hardware (thus, increasing the cost and complexity of the hardware involved) or involve the edge server performing minimal lightweight processing of the data before the data is sent to the server(s) in the cloud network.

Technical solution to the aforementioned problem may leverage an architecture in an edge application of the edge server to effectively process the data. In particular, the architecture in the edge application is based on a data processing and queueing framework, where a data processing module of the edge application is segregated into multiple stages with each stage having a data queue, for processing the data. In such examples, the edge server may process the data generated by the IoT devices in multiple stages instead of processing the entire data in a single stage (or data processing module), to generate processed data. Further, the edge server may evaluate a data processing load at each stage to decide whether the processed data may be directed to the next stage or some portion of the processed data may be directed to an external computing system for further processing. Thus, the edge application as discussed herein, may be able to efficiently process the data, without reducing the resolution of the data or building solutions into hardware or performing minimal lightweight processing of the data. Thereby, the edge server will be able to combat latency issues associated with processing the data, and thus reducing choking of the edge server.

In one or more examples, each stage may receive data from its associated data queue, process only a portion of the data, and determine whether a next stage can process the output from the present stage before pushing the output from the present stage to the next stage or to an external computing system so as to sequentially process the data. Thus, one of the main aspect of the present disclosure is to analyze throughput at each stage or rate at which data queue of the next stage is getting consumed, and push the output from the present stage to the next stage or the portion of the output to the external computing system. Thereby combatting latency issues associated with processing the data, and reducing choking of the edge server. In some examples, the external computing system is a data center. In some other examples, the external computing system is an edge server.

FIG. 1 is an example environment 100 in which various examples may be implemented as an enterprise system or a consumer system, or an industrial system that facilitates processing of Internet of Things (IoT) data (or data) in a computing system 102 and/or a data center 106. In the illustrated embodiment, the computing system 102 is an edge server or a first edge server. In the embodiment of FIG. 1, the data center 106 is an external computing system, which may be optionally used to process a portion of a partially processed data directed from the computing system 102. In an example embodiment, the environment 100 may be implemented as the industrial system for managing a smart city or production or assembly line of an industrial plant, or as the enterprise system for managing conference rooms, or as the consumer system for managing a smart home. In some embodiments, the example environment 100 that facilitates processing of the IoT data may include various components such as the computing system 102, a plurality of smart devices 104, for example, 104A, 104B, 104C, . . . , 104N, and the data center 106 communicatively coupled to the computing system 102 via a network 108. It should be noted herein that the term "smart device" may also be referred to as "IoT device".

The edge server 102 may communicate to, and transmit and receive data from the data center 106, the plurality of IoT devices 104, and/or other components in the network 108. The edge server 102 may include a first processing resource (not shown in FIG. 1) that implements machine readable program instructions to facilitate processing of the IoT data and communication in the network 108.

The data center 106 may include one or more servers in a cloud network communicatively coupled to the edge server 102 through the network 108. Each of the one or more servers may include a processor (not shown) operably coupled to a machine readable medium (not shown) storing program instructions therein. The processor may implement the machine readable program instructions to facilitate processing and/or storage of the IoT data. In some embodiments, the cloud network may be a private cloud network or a public cloud network.

The plurality of IoT devices 104 may be any type of IoT devices that are communicatively connected to the edge server 102. In some examples, the plurality of IoT devices 104 may be low-end devices that may be publicly deployed in a widespread manner. The low-end IoT devices may include, for example, an IoT device that does not include complex hardware, separate security modules, or any specialized combinations of hardware and programming that may facilitate analytical functionality by the IoT device. In some other examples, the plurality of IoT devices 104 may include one or multiple types of IoT devices on the network. The one or multiple types of IoT devices may include, for example, cameras, traffic signals, coffee makers, air quality sensors, thermostats, printers, lightbulbs, other sensors, and/or any other IoT devices. In some examples, at least some of the plurality of IoT devices 104 may be sensors which are deployed in the smart home or the assembly line. In one such example, the smart home may include a plurality of smart equipment, such as television, speaker, wearable, appliance, air conditioner, thermostat, lighting, security, and the like. In such examples, the sensors deployed in such smart equipment may interact with each other and produce data to manage the smart home. In another such example, the assembly line machine may be outfitted with sensors, which may produce data to operators, informing the operators about anomalies, and the like in the industrial plant. In one or more embodiments, the plurality of IoT devices may monitor the example environment 100 and produce data corresponding to changes in the example environment 100.

In some embodiments, the network 108 may a TCP/IP (Transmission Control Protocol/Internet Protocol) network, which is a suite of communication protocols used to interconnect network devices on the internet.

According to various implementations, the example environment 100 that facilitates processing of the IoT data and the various components described herein may be implemented in a hardware and/or a combination of the hardware and programming that configures the hardware. Furthermore, in FIG. 1 and other figures described herein, different numbers of components or entities than depicted may be used. In some examples, the example environment 100 that facilitates processing of the IoT data may include a set of edge servers, with at least one edge server 102 being communicatively connected to some of the plurality of IoT devices 104. In some embodiments, the plurality of IoT devices 104 is communicatively connected to the edge server 102 using a wired network, for example. In some other embodiments, at least some of the plurality of IoT devices 104 may be communicatively connected to the edge server 102 using a wireless network.

In the example embodiment, the edge server 102 includes an edge application 114 having at least one module, for example, a data processing module 116 hosted on the edge application 114. In one or more embodiments, the data processing module 116 is a module of computer executable program instructions, which is configured to be executed by the first processing resource to locally process IoT data so as to reduce volumes of the IoT data that needs to be transferred out of the edge server 102. In one or more embodiments, the data processing module 116 is logically segregated into a plurality of first edge-stages 118, for example, 118A, 118B, 118C, . . . , 118N. Each edge-stage of the plurality of first edge-stages 118 includes a corresponding data processing queue 120 (or an edge-queue.) In other words, the plurality of first edge-stages 118 includes a plurality of edge-queues 120, for example, 120A, 120B, 120B, . . . , 120N, each associated with the corresponding edge-stage 118A, 118B, 118C, . . . , 118N respectively. For example, the edge-stage 118A includes the edge-queue 120A, the edge-stage 118B includes the edge-queue 120B, and so on. In one or more embodiments, the plurality of edge-queues 120 is built over one or more industry standard messaging frameworks, such as Rabbitmq, Kafka, and the like. The plurality of first edge-stages 118 is arranged sequentially, such that each edge-stage of the plurality of first edge-stage is communicatively connected to a next edge-stage of the plurality of first edge-stage 118 via the edge-queue of the next edge-stage. For example, the edge-stage 118A is communicatively connected to the edge-stage 118B via the edge-queue 120B of the edge-stage 118B, and similarly, the edge-stage 118B is communicatively connected to the edge-stage 118C via the edge-queue 120C of the edge-stage 118C, and so on. Further, a first edge-stage 118A of the plurality of first edge-stages 118 is communicatively connected to the plurality of IoT devices 104 via the edge-queue 120A of the first edge-stage 118A. Similarly, a last edge-stage 118N of the plurality of first edge-stages 118 is communicatively connected to the data center 106 over the network 108.

In the example embodiment, the data center 106 includes a cloud application 124 having one or more modules, for example, a data processing module 126 and a database 134 hosted on the cloud application 124. In one or more embodiments, the data processing module 126 is a module of computer executable program instructions, which is configured to be executed by the processor (not shown) to process the IoT data received from the edge server 102. Similarly, the database 134 is a module of computer executable program instructions, which is configured to be executed by the processor to store the IoT data. In one or more embodiments, the data processing module 126 is logically segregated into a plurality of cloud-stages 128, for example, 128A, 128B, 128C, . . . , 128N. Each cloud-stage of the plurality of cloud-stages 128 includes a corresponding cloud-queue. In other words, the plurality of cloud-stages 128 includes a plurality of cloud-queues 130, for example, 130A, 130B, 130B, . . . , 130N, each associated with the corresponding cloud-stage 128A, 128B, 128C, . . . , 128N respectively. The plurality of cloud-stages 128 is arranged sequentially, such that each cloud-stage of the plurality of cloud-stages 128 is communicatively connected to a next cloud-stage of the plurality of cloud-stages 128 via the cloud-queue of the next cloud-stage. For example, the cloud-stage 128A is communicatively connected to the cloud-stage 128B via the cloud-queue 130B of the cloud-stage 128B, and similarly, the cloud-stage 128B is communicatively connected to the cloud-stage 128C via the cloud-queue 130C of the cloud-stage 128C, and so on. Further, a first cloud-queue 130A of the plurality of cloud-stages 128 is communicatively connected to the edge-queue 120A of the first edge-stage 118A. Similarly, a last cloud-stage 128N of the plurality of cloud-stages 128 is communicatively connected to the database 134 and the last edge-stage 118N of the plurality of first edge-stages 118 is communicatively connected to the database 134 via the network 108. Further, other cloud-queues 130B, 130C, 130N of the plurality of cloud-queues 130 are communicatively connected to the edge-stages 118A, 118B, 118C, respectively.

In one or more embodiments, each edge-stage of the plurality of first edge-stages 118 and each cloud-stage of the plurality of cloud-stages 128 may perform at least one of an extract, transform, or load (ETL) operations to completely process the IoT data and derive insights from the processed data.

During operation, the plurality of IoT devices 104 may produce data 112 and transfer the produced data 112 to the edge server 102. In one example, some of the plurality of IoT devices 104 may be IoT cameras, which may generate large amounts of visual data every second. The IoT cameras may have been deployed in the example environment 100 for surveillance purpose. In such examples, at least some of the plurality of IoT devices 104 may produce data 112 and transfer the data 112 to the edge server 102 via wired or wireless network. The edge server 102 may collect the data 112 from the plurality of IoT devices 104 in the edge-queue 120A and direct the data 112 to the first edge-stage 118A for processing at least a portion of the collected data 112. It may be noted herein that the term "edge-stage" and "first edge-stage" may be used interchangeably. In some embodiments, the edge server 102 may first evaluate a size of the edge-queue 120A before directing the data 112 to the edge-stage 118A. It should be noted herein that the edge server 102 may evaluate the size of the edge-queue 120A associated with the edge-stage 118A to determine whether the edge-stage 118A can process the collected data 112 without any latency issues. If it is determined that the edge-stage 118A cannot process the data 112, than the edge server 102 may push the data 112 from the edge-queue 120A as an unprocessed data 142 to an external computing system 106. In some embodiments, the edge server 102 may evaluate the size of the edge-queue 120A based on a used size of the edge-queue 120A and a threshold size of the edge-queue 120A. The process of evaluating the size of the edge-queue 120A is explained in greater details in FIG. 8.

Further, the edge-stage 118A may process a portion of the data 112 received from the edge-queue 120A to generate partially processed data 122. In one more embodiments, the edge-stage 118A may perform the ETL operations to process the collected data 112 and generate the partially processed data 122. It should be noted herein that the edge-stage 118A may perform the ETL operations only on the portion of the data 112 so as to quickly process the data 112, thereby reducing any latency issues associated with processing the data 112. The edge server 102 may further evaluate a data processing load at the edge-stage 118A based on a throughput of the edge-stage 118A or a size of the edge-queue 120B. It should be noted herein that the edge server 102 may perform the step of evaluating the data processing load at each edge-stage to decide an optimal path to further process the partially processed data, thereby reducing latency issues associated with further processing of the data 112. In some embodiments, the optimal path may include the next edge-stage 118B or to the data center 106 for further processing the partially processed data 122.

In some embodiments, the edge server 102 may evaluate the data processing load at the edge-stage 118A based on the throughput of the edge-stage 118A. In order to determine the throughput of the edge-stage 118A, the edge server 102 may determine a plurality of parameters in relation to the edge-stage 118A. The parameters may include a production rate of a previous edge-stage, a consumption rate of the edge-stage 118A, a wait time for the edge-stage 118A to push the partially processed data 122, and a predefined wait time for the edge-stage 118A to push the partially processed data 122. It should be noted herein that the term "production rate" refers to a rate at which the previous edge-stage can process the data, and the term "consumption rate" refers to a rate at which the current edge-stage can receive and process the data. Similarly, the term "wait time" refers to a lead time for pushing the data from the current edge-stage, and the term "predefined wait time" refer to a predefined lead time for pushing the data from the current edge-stage. In some examples, the edge server 102 may first compare the production rate of the previous edge-stage with the consumption rate of the current edge-stage 118A. Based on the comparison, if it is determined that the production rate is lesser than the consumption rate, than the edge server 102 may push the partially processed data 122 to the next edge-stage 118B. However, if the edge sever 102 determines that the production rate is greater than the consumption rate, than the edge server 102 may further compare the wait time with the predefined wait time. Based on the comparison, if it is determined that the wait time is lesser than the predefined wait time, than the edge server 102 may push the partially processed data 122 to the next edge-stage 118B. However, if the edge server 102 determines that the wait time is greater than the predefined wait time, that the edge server 102 may push a portion 122A of the partially processed data to the external computing system 106 and a remaining portion 122B of the partially processed data 122 to the next edge-stage 118B. The process of evaluating the data processing load at the edge-stage based on the throughput of the edge-stage is further explained in conjunction with FIG. 6.

In some other embodiments, the edge server 102 may evaluate the data processing load at the edge-stage 118A based on the size of the edge-queue 120B. In order to determine the size of the edge-stage 120B, the edge server 102 may determine a plurality of parameters in relation to the edge-queue 120B. The parameters may include a used size of the edge-queue 120B and a threshold size of the edge-queue 120B. It should be noted herein that the term "used size" refers to an amount of data stored in the next edge-queue 120B for consumption by the next edge-stage 118B, and the term "threshold size" refers to a maximum amount of data which the next edge-queue 120B can store for consumption by the next edge-stage 118B. In some examples, the edge server 102 may compare the used size of the next edge-queue 120B with the threshold size of the next edge-queue 120B. Based on the comparison, if it is determined that the used size is lesser than the threshold size, than the edge server 102 may push the partially processed data 122 to the next edge-stage 118B. However, if the edge sever 102 determines that the used size is greater than the threshold size, than the edge server 102 may push a portion 122A of the partially processed data to the external computing system 106 and a remaining portion 122B of the partially processed data 122 to the next edge-stage 118B. The process of evaluating the data processing load at the edge-stage based on the size of the edge-queue is explained in conjunction with FIG. 7.

The edge server 102 may repeat the aforementioned steps to: process the partially processed data 122 and/or the remaining portion 122B, evaluate the data processing load of all subsequent edge-stages 118B, 118C, . . . , 118N, and push the partially processed data 122, in all subsequent edge-stages 118B, 118C, . . . , 118N, until the data 112 is completely processed in the edge application 114. The edge server 102 may finally push the completely processed data 122C from the last edge-stage 118N to the database 134 hosted in the cloud application 124 via the network 108, for storage and analysis of the completely processed data 122C.

In one or more embodiments, the portion 122A of the partially processed data 122 pushed from the first edge-stage 118A is received by a cloud-queue, for example, a cloud queue 130B of the cloud application 126 hosted in the data center 106. In such example embodiments, the one or more servers in the data center 106 may process the portion 122A of the partially processed data 122 and/or the unprocessed data 142 in the plurality of cloud-stages 128, until the data 122 is completely processed. Further, the one or more servers of the data center 106 may push completely processed data 122D from the last cloud-stage 128N to the database 134 hosted in the cloud application 124 for storage and analysis of the completely processed data 122D.

Figure 2:
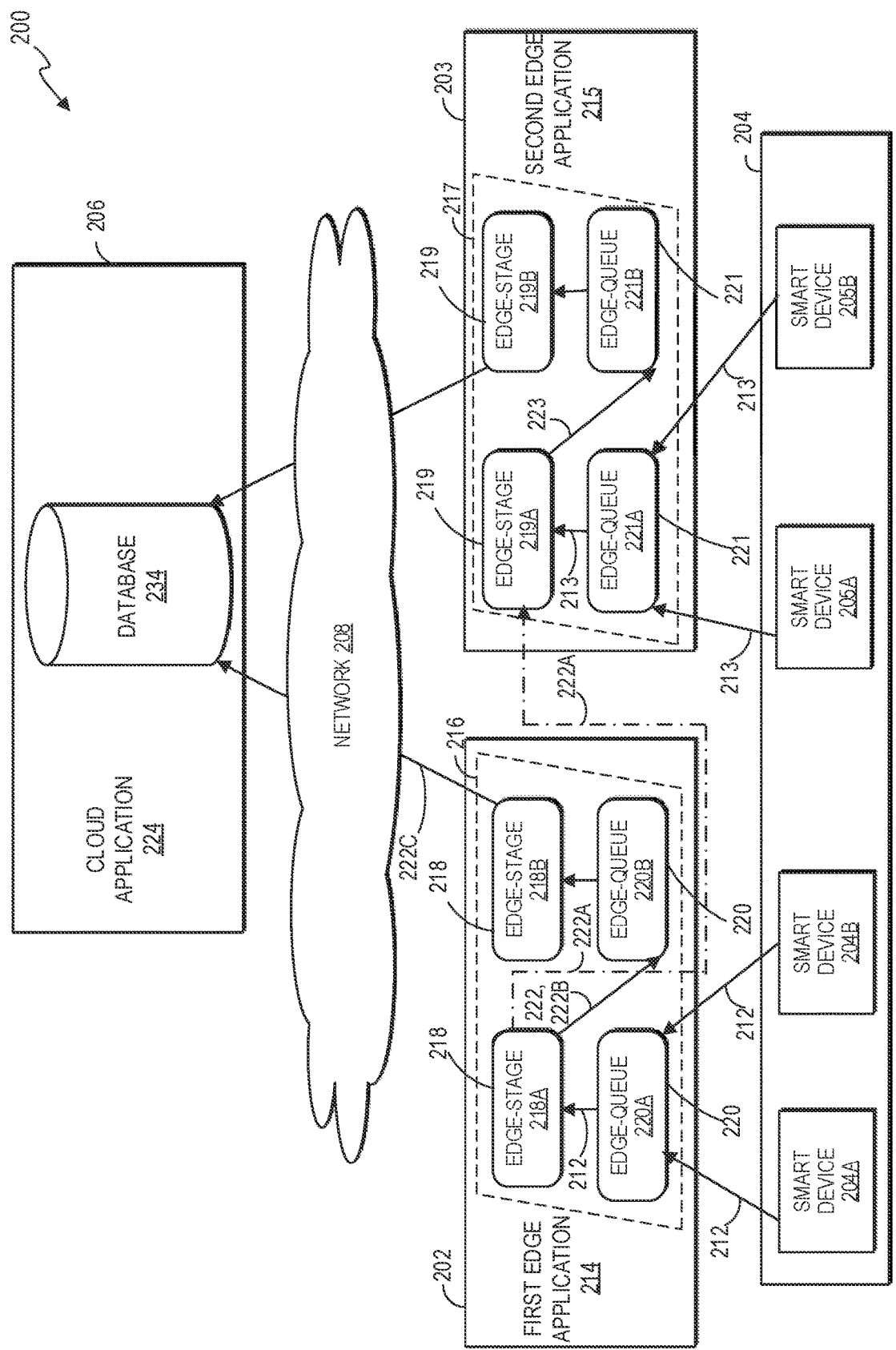
FIG. 2 is a block diagram depicting an example environment in which various examples may be implemented as a system that facilitates processing of IoT data using a first computing system and a second computing system.

FIG. 2 is an example environment 200 in which various examples may be implemented as an enterprise system or solution, that facilitates processing of Internet of Things (IoT) data (or data) in a first computing system 202 and/or a second computing system 203. In the illustrated embodiment, the first computing system 202 is a first edge server and the second computing system 203 is a second edge server. In the embodiment of FIG. 2, the second computing system 203 may also be referred as an external computing system, which may be optionally used to process a portion of a partially processed data received from the first computing system 202. In some embodiments, the example environment 200 that facilitates processing of the IoT data may include various components such as the first computing system 202, the second computing system 203, a plurality of smart devices 204, for example, 204A, 204B, 205A, 205B, and a data center 206 communicatively coupled to the first and second computing systems 202, 203 via a network 208.

It should be noted herein that the term "smart device" may also be referred to as "IoT device".

The first and second edge servers 202, 203 may communicate to, and transmit and receive data from the data center 206, the plurality of IoT devices 204, and/or other components in the network 208. The first edge server 202 may include a first processing resource (not shown in FIG. 2) that implements machine readable program instructions to facilitate processing of the IoT data and communication in the network 208. Similarly, the second edge server 203 may include a second processing resource (not shown in FIG. 2) that implements machine readable program instructions to facilitate processing of the IoT data and communication in the network 208.

The data center 206 may include one or more servers in a cloud network communicatively coupled to the first and second edge servers 202, 203 through the network 208. Each of the one or more servers may include a processor (not shown) operably coupled to a machine readable medium (not shown) storing program instructions therein. The processor implements the machine readable program instructions to facilitate processing and/or storage of the IoT data. In some embodiments, the cloud network may be a private cloud network or a public cloud network.

As described in the embodiment of FIG. 1, the plurality of IoT devices 204 may be any type of IoT devices that are communicatively connected to the first and second edge servers 202, 203. In one or more embodiments, the plurality of IoT devices may monitor the example environment 200 and produce data corresponding to changes in the example environment 200. As discussed, in the embodiment of FIG. 1, the network 208 may be a TCP/IP (Transmission Control Protocol/Internet Protocol) network, which is a suite of communication protocols used to interconnect network devices on the internet.

In the example embodiment, the first edge server 202 includes a first edge application 214 having at least one module, for example, a first data processing module 216 hosted on the first edge application 214. In one or more embodiments, the first data processing module 216 is a module of computer executable program instructions, which is configured to be executed by the first processing resource to locally process IoT data so as to reduce volumes of the IoT data that needs to be transferred out of the edge server 202. In one or more embodiments, the first data processing module 216 is logically segregated into a plurality of first edge-stages 218, for example, 218A, 218B. Each edge-stage of the plurality of first edge-stages 218 includes a corresponding data processing queue 220 (or an edge-queue.) In other words, the plurality of first edge-stages 218 includes a plurality of edge-queues 220, for example, 220A, 220B, each associated with the corresponding edge-stage 218A, 218B respectively. The plurality of first edge-stages 218 is arranged sequentially, such that each edge-stage of the plurality of first edge-stages 218 is communicatively connected to a next edge-stage of the plurality of first edge-stages 218 via the edge-queue of the next edge-stage. For example, the edge-stage 218A is communicatively connected to the edge-stage 218B via the edge-queue 220B of the edge-stage 218B. Further, a last edge-stage 218B of the plurality of first edge-stages 218 is communicatively connected to the data center 206 over the network 208.

Further, the second edge server 203 includes a second edge application 215 having at least one module, for example, a second data processing module 217 hosted on the second edge application 215. In one or more embodiments, the second data processing module 217 is a module of computer executable program instructions, which is configured to be executed by the second processing resource to locally process IoT data so as to reduce volumes of the IoT data that needs to be transferred out of the edge server 203. In one or more embodiments, the second data processing module 217 is logically segregated into a plurality of second edge-stages 219, for example, 219A, 219B. Each edge-stage of the plurality of second edge-stages 219 includes a corresponding data processing queue 221 (or an edge-queue.) In other words, the plurality of second edge-stages 219 includes a plurality of edge-queues 221, for example, 221A, 221B, each associated with the corresponding edge-stage 219A, 219B respectively. In one or more embodiments, the plurality of edge-queues 221 is built over industry standard messaging framework, such as Rabbitmq, Kafka, and the like. The plurality of second edge-stages 219 is arranged sequentially, such that each edge-stage of the plurality of second edge-stages 219 is communicatively connected to a next edge-stage of the plurality of second edge-stages 219 via the edge-queue of the next edge-stage. For example, the edge-stage 219A is communicatively connected to the edge-stage 219B via the edge-queue 221B of the edge-stage 219B. Further, a last edge-stage 219B of the plurality of second edge-stages 219 is communicatively connected to the data center 206 over the network 208. In the example embodiment, the first edge-stage 218A of the first edge server 202, is communicatively connected to first edge-stage 219A of the second edge server 203.

In the example environment, the IoT devices 204A, 204B are communicatively connected to the first edge server 202. Similarly, the IoT devices 205A, 205B are communicatively connected to the second edge server 203. In some embodiments, the IoT devices 204A, 204B, 205A, 205B are communicatively connected to the first and second edge servers 202, 203 respectively using a wired network, for example. In some other embodiments, the IoT devices 204A, 204B, 205A, 205B may be communicatively connected to the first and second edge servers 202, 203 respectively using a wireless network. In the example embodiment, the IoT devices 204A, 204B are communicatively connected to the edge-queue 220A of the first edge server 202. Similarly, the IoT devices 205A, 205B are communicatively connected to the edge-queue 221A of the second edge server 203.

In the example embodiment, the data center 206 includes a cloud application 224 having at least one module, for example, a database 234 hosted on the cloud application 224. In one or more embodiments, the database 234 is a module of computer executable program instructions, which is configured to be executed by a processor to store the IoT data.

In one or more embodiments, each edge-stage of the plurality of first edge-stages 218 and each edge-stage of the plurality of second edge-stages 219 perform at least one of an extract, transform, or load (ETL) operations to process the IoT data, based on the business requirement. At each edge-stage of the plurality of first edge-stage 218 and each edge-stage of the plurality of second edge-stages 219, a specific ETL operation may be performed on the IoT data to generate the partially processed data.

During operation, the IoT devices 204A, 204B may produce data 212, as discussed in FIG. 1 and transfer the data 212 to the first edge server 202, for example. The first edge server 202 may collect the data 212 from the IoT devices 204A, 204B in the edge-queue 220A and direct the data 212 to the edge-stage 218A for processing at least a portion of the collected data 212. In one more embodiments, the edge-stage 218A may perform the ETL operations to process the portion of the collected data 212 and generate partially processed data 222. It should be noted herein that the edge-stage 218A may perform the ETL operations only on the portion of the data 212 so as to quickly process the data 212, thereby reducing any latency issues associated with processing the data 212. The first edge server 202 may further evaluate a data processing load at the edge-stage 218A based on a throughput of the edge-stage 218A or a size of the edge-queue 220B. It should be noted herein that the first edge server 202 may perform the step of evaluating the data processing load at each edge-stage to decide an optimal path to further process the partially processed data, thereby reducing latency issues associated with further processing of the data 212. In some embodiments, the optimal path may include the next edge-stage 218B or to the second edge server 203 for further processing the partially processed data 222.

In some embodiments, the first edge server 102 may evaluate the data processing load at the edge-stage 218A based on the throughput of the edge-stage 218A. In order to determine the throughput of the edge-stage 218A, the first edge server 202 may determine a plurality of parameters in relation to the edge-stage 218A. The parameters may include a production rate of a previous edge-stage, a consumption rate of the current edge-stage 218A, a wait time for the current edge-stage 218A to push the partially processed data 222, and a predefined wait time for the current edge-stage 218A to push the partially processed data 222. In some examples, the first edge server 202 may first compare the production rate of the previous edge-stage with the consumption rate of the current edge-stage 218A. Based on the comparison, if it is determined that the production rate is lesser than the consumption rate, than the first edge server 202 may push the partially processed data 222 to the next edge-stage 218B. However, if the first edge sever 202 determines that the production rate is greater than the consumption rate, than the first edge server 202 may further compare the wait time with the predefined wait time. Based on the comparison, if it is determined that the wait time is lesser than the predefined wait time, than the first edge server 202 may push the partially processed data 222 to the next edge-stage 218B. However, if the first edge server 202 determines that the wait time is greater than the predefined wait time, that the first edge server 202 may push a portion 222A of the partially processed data to the second edge server 203 and a remaining portion 222B of the partially processed data 222 to the next edge-stage 218B. The process of evaluating the data processing load at the edge-stage based on the throughput of the edge-stage is explained in conjunction with FIG. 6.

In some other embodiments, the first edge server 202 may evaluate the data processing load at the edge-stage 218A based on the size of the edge-queue 220B. In order to determine the size of the edge-stage 220B, the first edge server 202 may determine a plurality of parameters in relation to the edge-queue 220B. The parameters may include a used size of the next edge-queue 220B and a threshold size of the next edge-queue 220B. In some examples, the first edge server 202 may compare the used size of the next edge-queue 220B with the threshold size of the next edge-queue 220B. Based on the comparison, if it is determined that the used size is lesser than the threshold size, than the first edge server 202 may push the partially processed data 222 to the next edge-stage 218B. However, if the first edge sever 202 determines that the used size is greater than the threshold size, than the first edge server 202 may push a portion 222A of the partially processed data to the second edge server 203 and a remaining portion 222B of the partially processed data 222 to the next edge-stage 218B. The process of evaluating the data processing load at the edge-stage based on the size of the edge-queue is explained in conjunction with FIG. 7.

The first edge server 202 may repeat the aforementioned steps to: process the partially processed data 222 and/or the remaining portion 222B, evaluate the data processing load of the next edge-stage 218B, and push the partially processed data 222 in the next edge-stage 218B, until the data 212 is completely processed in the first edge application 214. The edge server 202 may push completely processed data 222C from the last edge-stage 218B to the database 234 hosted in the cloud application 224 via the network 208, for storage and analysis of the completely processed data 222C.

Similar to the first edge server 202, the second edge server 203 may also collect data 213 independently from the IoT devices 205A, 205B in the edge-queue 221A to sequentially process the collected data 213 in each of the plurality of second edge-stages 219, until the data 213 is completely processed. In the example embodiment, the second edge server 203 may additionally receive a request to process the portion 222A of the partially processed data 222 from the first edge server 202. In such example embodiment, the second edge server 203 may evaluate a data processing load at the edge-stage 219A based on a throughput of the edge-stage 219A or a size of the edge-queue 221B of a next edge-stage 219B. It should be noted herein that the second edge server 203 may perform the step of evaluating the data processing load at the edge-stage 219A to decide whether the second edge server 203 can process the portion 222A of the partially processed data 222 without having any latency issues associated with processing the data 213 received from the edge-queue 221A.

In some embodiments, the second edge server 203 may evaluate the data processing load at the edge-stage 219A based on the throughput of the edge-stage 219A. In order to determine the throughput of the edge-stage 219A, the second edge server 203 may determine a plurality of parameters in relation to the edge-stage 218A. The parameters may include a production rate of a previous edge-stage, a consumption rate of the current edge-stage 219A, a wait time for the current edge-stage 219A to push partially processed data 223, and a predefined wait time for the current edge-stage 219A to push the partially processed data 223. In some examples, the second edge server 203 may compare i) the production rate of the previous edge-stage with the consumption rate of the current edge-stage 219A and ii) the wait time for the current edge-stage 219A with the predefined wait time for the current edge-stage 219A. Based on the comparison, if it is determined that the production rate is lesser than the consumption rate and the wait time is lesser than the predefined wait time, than the second edge server 203 may accept the request to process the portion 222A of the partially processed data 222 from the first edge server 202. However, if the second edge sever 203 determines that the production rate is greater than the consumption rate and the wait time is greater than the predefined wait time, than the second edge server 203 may reject the request to process the portion 222A of the partially processed data 222 from the first edge server 202.

In some other embodiments, the second edge server 203 may evaluate the data processing load at the edge-stage 219A based on the size of the edge-queue 221B. In order to determine the size of the edge-stage 221B, the second edge server 203 may determine a plurality of parameters in relation to the edge-queue 221B. The parameters may include a used size of the next edge-queue 221B and a threshold size of the next edge-queue 221B. In some examples, the second edge server 203 may compare the used size of the next edge-queue 221B with the threshold size of the next edge-queue 221B. Based on the comparison, if it is determined that the used size is lesser than the threshold size, than the second edge server 203 may accept the request to process the portion 222A of the partially processed data 222 from the first edge server 202. However, if the second edge sever 203 determines that the used size is greater than the threshold size, than the second edge server 203 may reject the request to process the portion 222A of the partially processed data 222 from the first edge server 202.

Based on the evaluation of the data processing load in the edge-stage 219A as discussed herein, the second edge server 203 may collect the portion 222A of the partially processed data 222 from the first edge server 202 and sequentially process the portion 222A of the partially processed data 222 in the plurality of second edge-stages 219, until the data is completely processed. Further, the second edge server 203 may push completely processed data 222D from the last edge-stage 219B to the database 234 hosted in the second cloud application 225 for storage and analysis of the completely processed data 222D. The process of evaluating the data processing load in the edge-stage of the second edge server 203 is explained in conjunction with FIG. 9.

Figure 3A:
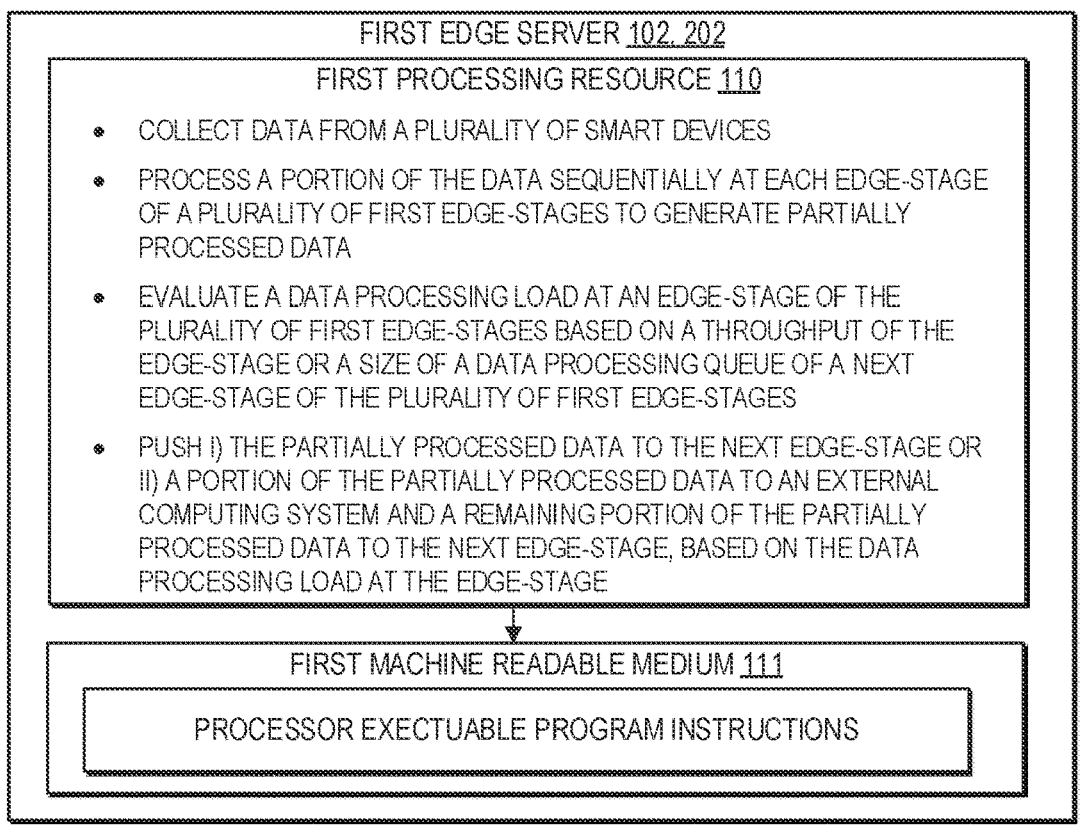
FIG. 3A is a block diagram depicting a first computing system having a first processing resource operably coupled to a first machine readable medium storing executable program instructions.

FIG. 3A is a block diagram of first edge servers 102, 202 including a first processing resource 110 and a first machine readable medium 111 storing executable program instructions. It should be noted herein that the first edge servers 102, 202 referred to in FIG. 3A may be same or similar to first edge servers 102, 202 described in FIGS. 1-2. In the example embodiment, the first processing resource 110 is operably coupled to the first machine readable medium 111.

The first processing resource 110 may be a physical processor. In some examples, the physical processor may be at least one of a central processing unit (CPU,) a graphics processing unit (GPU,) a microprocessor, and/or other hardware devices suitable for performing the functionality described in relation to FIGS. 1 and 2. In some examples, the first machine readable medium 111 is non-transitory and is alternatively referred to as a non-transitory machine readable medium 111.

The first processing resource 110 executes one or more program instructions to perform one or more functions described in FIGS. 1-2. For example, the first processing resource 110 may execute program instructions to collect data from a plurality of smart devices (or IoT devices) and process at least a portion of the collected data sequentially at each edge-stage of a plurality of first edge-stages to generate partially processed data. The details of collecting and processing the data are described in conjunction with FIGS. 1-2. The first processing resource 110 may further execute the program instructions to evaluate a data processing load at an edge-stage of the plurality of first edge-stages based on a throughput of the edge-stage or a size of a data processing queue (edge-queue) of a next edge-stage of the plurality of first edge-stages. The details of evaluating the data processing load at an edge-stage of the plurality of edge-stages is described in conjunction with FIGS. 1-2. Further, the first processing resource 110 may execute the program instructions to push i) the partially processed data to the next edge-stage or ii) a portion of the partially processed data to an external computing system and a remaining portion of the partially processed data to the next edge-stage, based on the data processing load at the edge-stage. The details of pushing the partially processed data is described in conjunction with FIGS. 1-2.

Figure 3B:
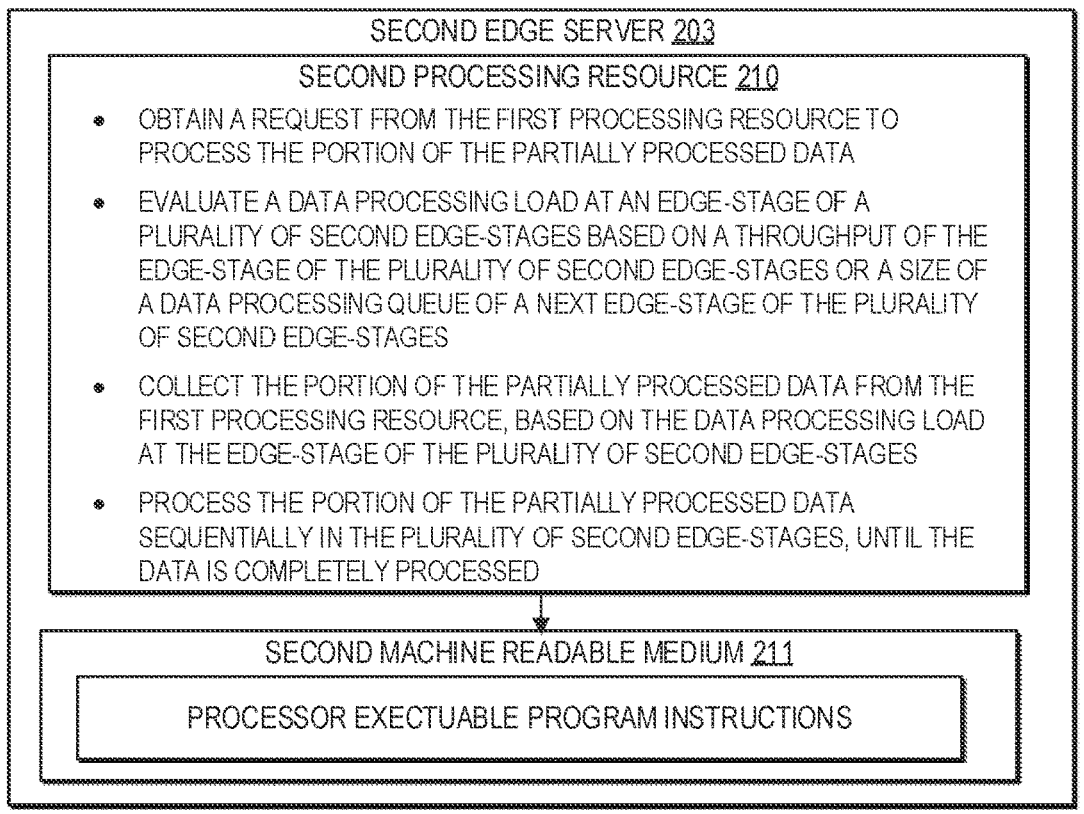
FIG. 3B is a block diagram depicting a second computing system having a second processing resource operably coupled to a second machine readable medium storing executable program instructions.

FIG. 3B is a block diagram of second edge server 203 including a second processing resource 210 and a second machine readable medium 211 storing executable program instructions. It should be noted herein that the second edge server 203 referred to in FIG. 3B may be same or similar to second edge server 203 described in FIG. 2. In the example embodiment, the second processing resource 210 is operably coupled to the second machine readable medium 211.

The second processing resource 210 may be a physical processor. In some examples, the physical processor may be at least one of a central processing unit (CPU,) a graphics processing unit (GPU,) a microprocessor, and/or other hardware devices suitable for performing the functionality described in relation to FIGS. 1-2. In some examples, the second machine readable medium 211 is non-transitory and is alternatively referred to as a non-transitory machine readable medium 211.

The second processing resource 210 executes one or more program instructions to perform one or more functions described in FIG. 2. For example, the second processing resource 210 may execute program instructions to obtain a request from the first processing resource 110 (shown in FIG. 3A) to process the portion of the partially processed data. The details of obtaining the request from the second edge server 202 is described in conjunction with FIG. 2. The second processing resource 210 may further execute the program instructions to evaluate a data processing load at an edge-stage of the plurality of second edge-stages based on a throughput of the edge-stage of the plurality of second edge-stages or a size of a data processing queue of a next edge-stage of the plurality of second edge-stages. The details of evaluating the data processing load at the edge-stage of the plurality of second edge stages is described in conjunction with FIG. 2. Further, the second processing resource 210 may execute the program instructions to process the portion of the partially processed data sequentially in the plurality of second edge-stages, until the data is completely processed. The details of processing the data is in the plurality of second edge-stages is described in conjunction with FIG. 2.

FIG. 4A is a block diagram 300 depicting a first processing resource 110 and a first machine readable medium 111 encoded with example instructions to process data in a first computing system, such as, a first edge server 102, 202. It should be noted herein that the elements 102, 202, 110, 111 referred to in FIG. 4A may be same or similar to elements 102, 202, 110, 111 described in FIG. 3A. The first machine readable medium 111 is non-transitory and is alternatively referred to as a non-transitory machine readable medium. In some examples, the machine readable medium 111 may be accessed by the first processing resource 110.

The first machine readable medium 111 may be encoded with example instructions 302, 304, 306, 308. The instruction 302, when executed by the first processing resource 110, may implement aspects of collecting data from a plurality of smart devices in an edge-stage of the plurality of first edge-stages 118, 218. These elements 118, 218 may be same or similar to elements 118, 218 described in FIGS. 1-2. The instruction 304, when executed, may cause the first processing resource 110 to process a portion of the collected data sequentially at each edge-stage of the plurality of first edge-stages 118, 218 to generate partially processed data, as described in FIGS. 1-2. The instruction 306, when executed, may cause the first processing resource 110 to evaluate a data processing load at an edge-stage of the plurality of first edge-stages 118, 218 based on a throughput of the edge-stage or a size of a data processing queue of a next edge-stage of the plurality of first edge-stages 118, 218, as described in FIGS. 1-2. Further, in some implementations, the instructions 308, when executed, may cause the first processing resource 110 to push i) the partially processed data to the next edge-stage or ii) a portion of the partially processed data to an external computing system and a remaining portion of the partially processed data to the next edge-stage, as described in FIGS. 1-2. In some embodiments, the instructions 308 may include instructions to be executed by a second processing resource 210 (shown in FIGS. 3B and 4B) of the external computing system, for example, a second edge server 203 to completely process the portion of the partially processed data transferred (or pushed) from the first processing resource 110 of the first edge server 202, as described in FIG. 2.

FIG. 4B is a block diagram 400 depicting a second processing resource 210 and a second machine readable medium 211 encoded with example instructions to process data in a second computing system, for example, a second edge server 203. It should be noted herein that the elements 203, 210, 211 referred to in FIG. 4B may be same or similar to the elements 203, 210, 211 described in FIG. 3B. The second machine readable medium 211 is non-transitory and is alternatively referred to as a non-transitory machine readable medium. In some examples, the machine readable medium 211 may be accessed by the second processing resource 210.

The second machine readable medium 211 may be encoded with example instructions 402, 404, 406, 408. The instruction 402, when executed by the second processing resource 210, may implement aspects of obtaining a request from the first processing resource 110 to process the portion of the partially processed data in an edge-stage of the plurality of second stages 219. This element 219 may be same or similar to element 219 described in FIG. 2. The instruction 404, when executed, may cause the second processing resource 210 to evaluate a data processing load at the edge-stage of the plurality of second edge-stages 219 based on a throughput of the edge-stage or a size of a data processing queue of a next edge-stage of the plurality of second edge-stages 219, as described in FIG. 2. Further, the instructions 406, when executed, may cause the second processing resource 210 to collect the portion of the partially processed data from the first processing resource 110 in the edge-stage of the plurality of second edge-stages 219, as described in FIG. 2. The instructions 408, when executed, may cause the second processing resource 210 to process the portion of the partially processed data sequentially in the plurality of second edge-stages 219, until the data is completely processed in the second edge server 203, as descried in FIG. 2.

Referring now to FIGS. 5-9, flow diagrams depicting various example methods are presented. In some implementations, one or more blocks of these example methods may be executed substantially concurrently or in a different order than shown. In some implementations, a method may include more or fewer blocks than are shown. In some implementations, one or more of the blocks of these example methods may, at certain times, be ongoing and/or may repeat.

Figure 7:
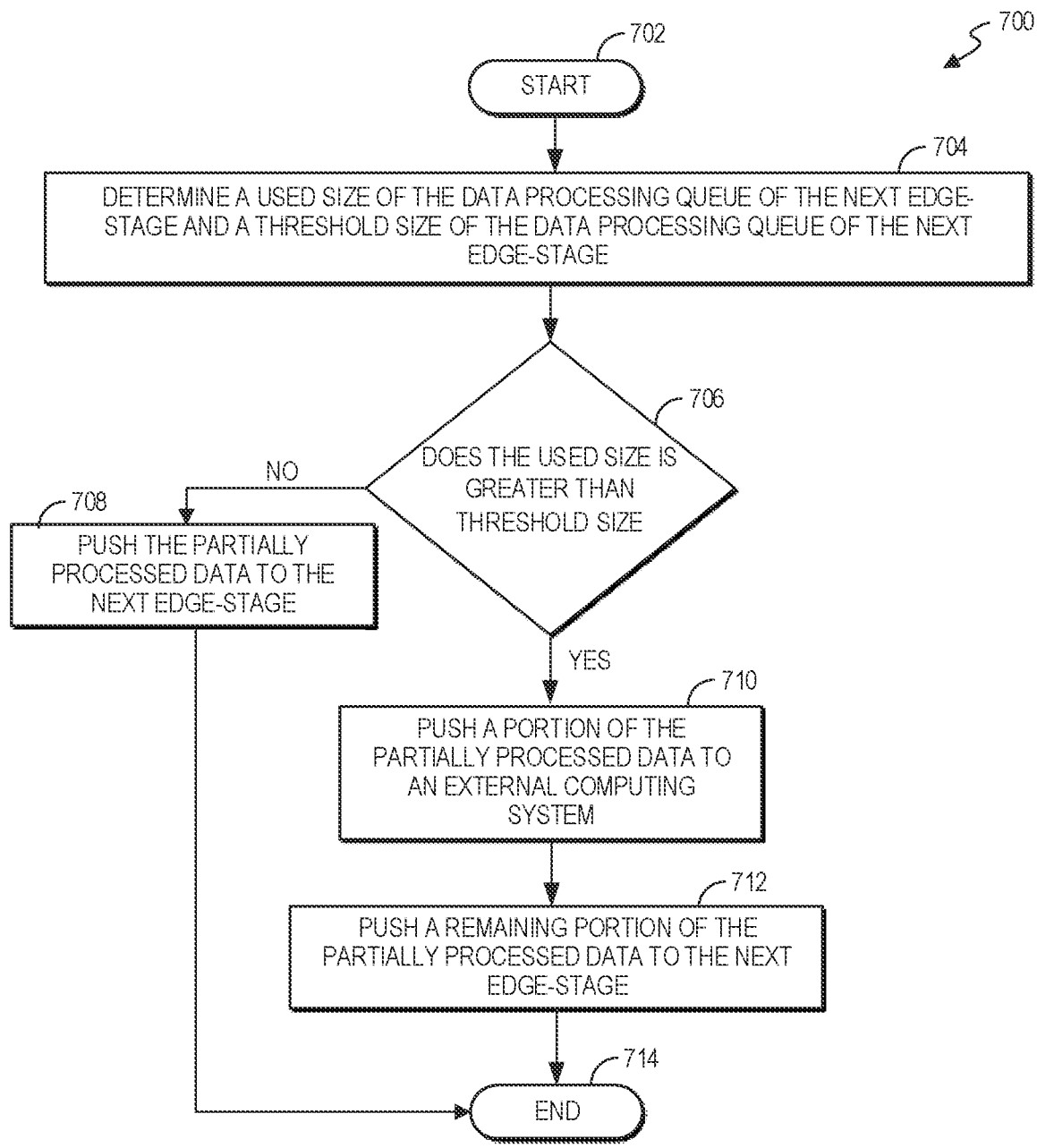
FIG. 7 is a flow diagram depicting an example method to determine a size of a data processing queue of a next edge-stage of a plurality of first edge-stages in a first computing system.
Figure 8:
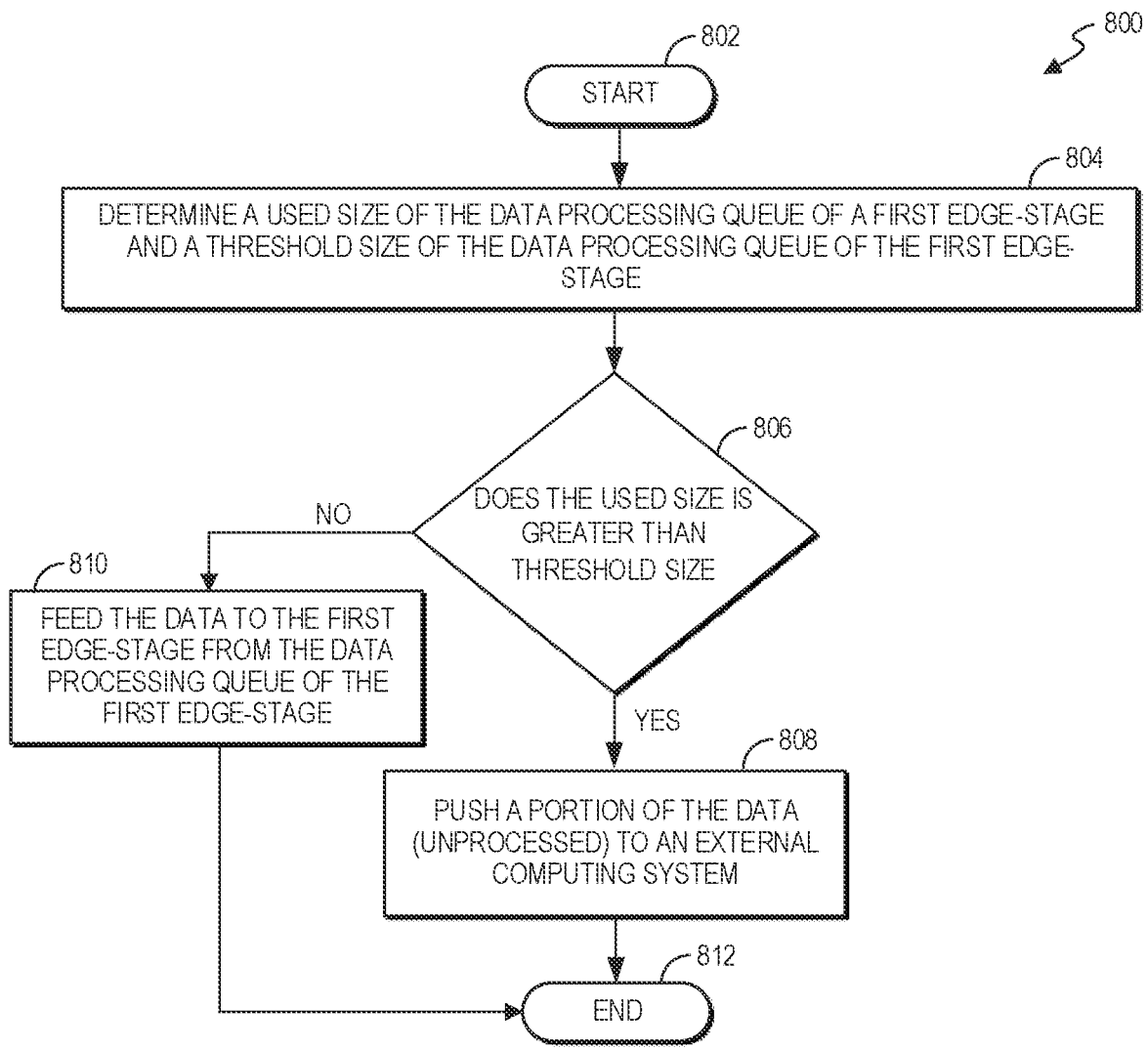
FIG. 8 is a flow diagram depicting an example method to determine a size of the data processing queue of a first edge-stage of a plurality of first edge-stages in a first computing system.
Figure 9:
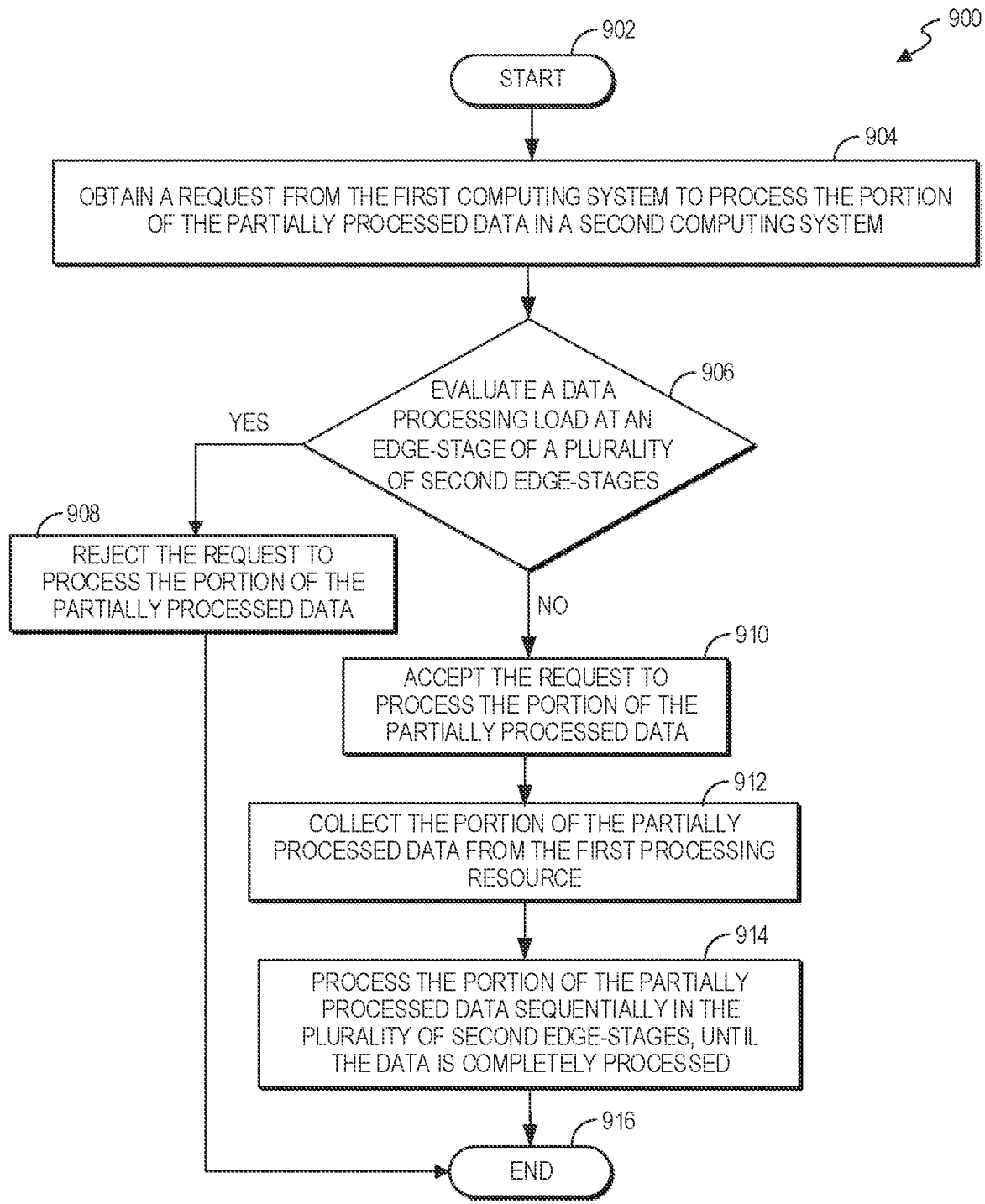
FIG. 9 is a flow diagram depicting an example method to push a portion of the partially processed data to a second computing system from a first computing system.

The methods of FIGS. 5-9 may be implemented via use of executable program instructions stored on a machine readable media (e.g., the machine readable medium 111, 211) that are executable by a processing resource (e.g., such as a first and second processing resources 110, 210) and/or in the form of electronic circuitry. In some examples, aspects of these methods may be performed by the plurality of first edge-stages 118, 218, and the plurality of second edge-stages 219, or components thereof. The methods of FIGS. 5-8 are described as being executed by the first processing resource 110 and the method of FIG. 9 is described as being executed by the second processing resource 210, for example. Additionally, the methods of FIGS. 5-9 are described with reference to FIGS. 1-2.

Figure 5:
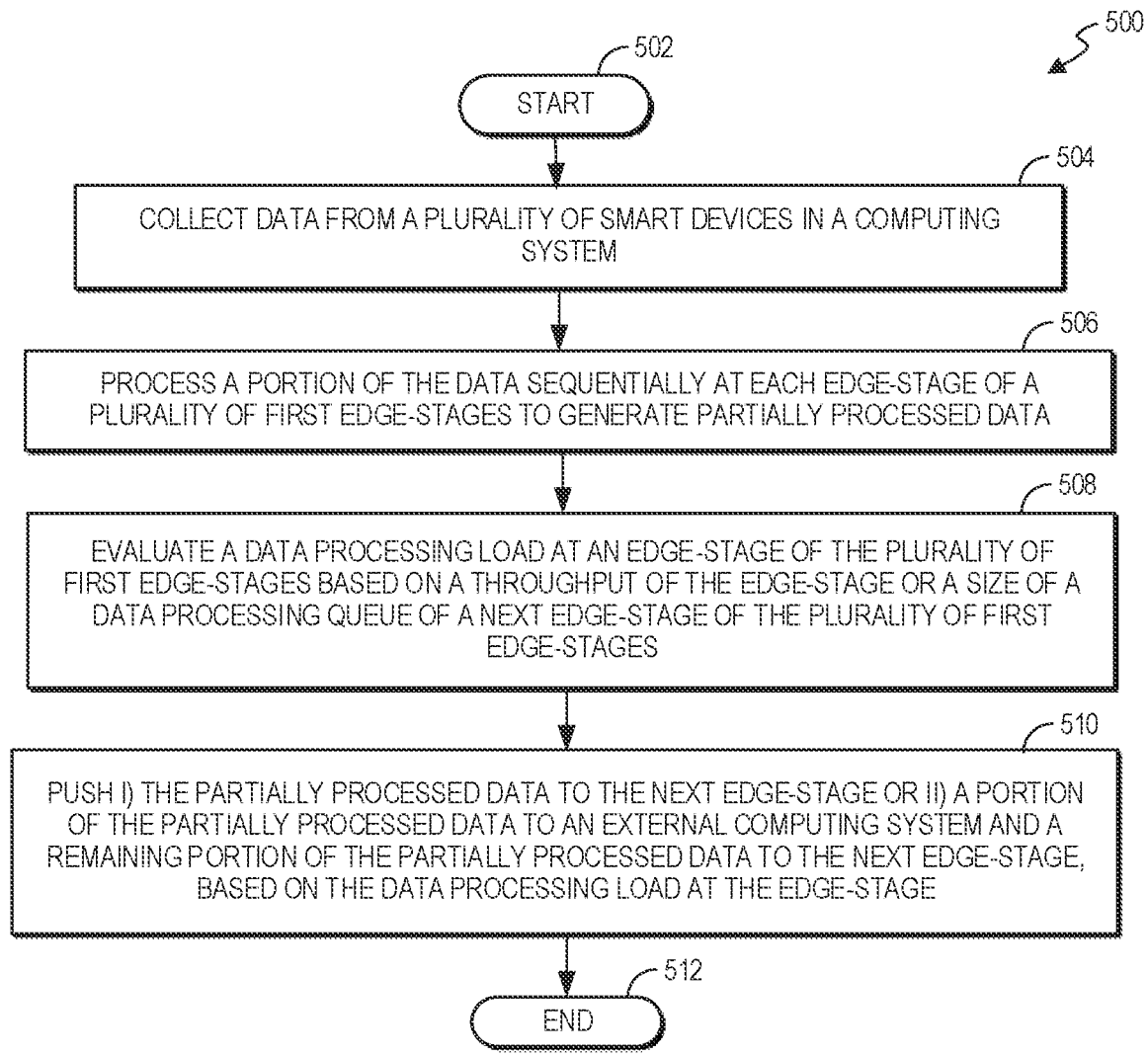
FIG. 5 is a flow diagram depicting an example method to process the data in a computing system.

FIG. 5 is a flow diagram depicting an example method 500 to process IoT data in the example environments 100, 200, as described in the embodiment of FIGS. 1-2. The method 500 starts at block 502 and continues to block 504. At block 504, the method 500 includes collecting data from a plurality of smart devices 104, 204 in a computing system, for example, a first edge server 102, 202. These elements 102, 104, 202, 204 may be same or similar to elements 102, 104, 202, 204 described in FIGS. 1-2. The method 500 further continues to block 506. At block 506, the method 500 includes processing a portion of the data sequentially at each edge-stage of the plurality of first edge-stages to generate partially processed data, as described in FIGS. 1-2. Further, the method 500 continues to block 508. At block 508, the method 500 includes evaluating a data processing load at an edge-stage of the plurality of first edge-stages based on a throughput of the edge-stage or a size of a data processing queue of a next edge-stage of the plurality of first edge-stages, as described in FIGS. 1-2. Further, in response to evaluation of the data processing load at the edge-stage, the method 500 includes pushing i) partially processed data to the next edge-stage of the plurality of first edge-stages or ii) a portion of the partially processed data to an external computing system and a remaining portion of the partially processed data to the next edge-stage of the plurality of first edge-stages, as described in FIGS. 1-2. In some embodiments, the external computing system is a data center. Details of the functions performed at block 510, when the external computing system is the data center, are described in FIG. 1. In some other embodiments, the external computing system is a second edge server. Details of the functions performed at the block 510, when the external computing system is the second edge server, are described in FIG. 2. The method 500 may further include repeating at each next edge-stage of the plurality of first edge-stages, the steps of evaluating the data processing load and pushing the partially processed data, until the data is completely processed. Once the first edge server 102, 202 completely process the data in the plurality of first edge-stages, the method 500 ends at the block 512.

Figure 6:
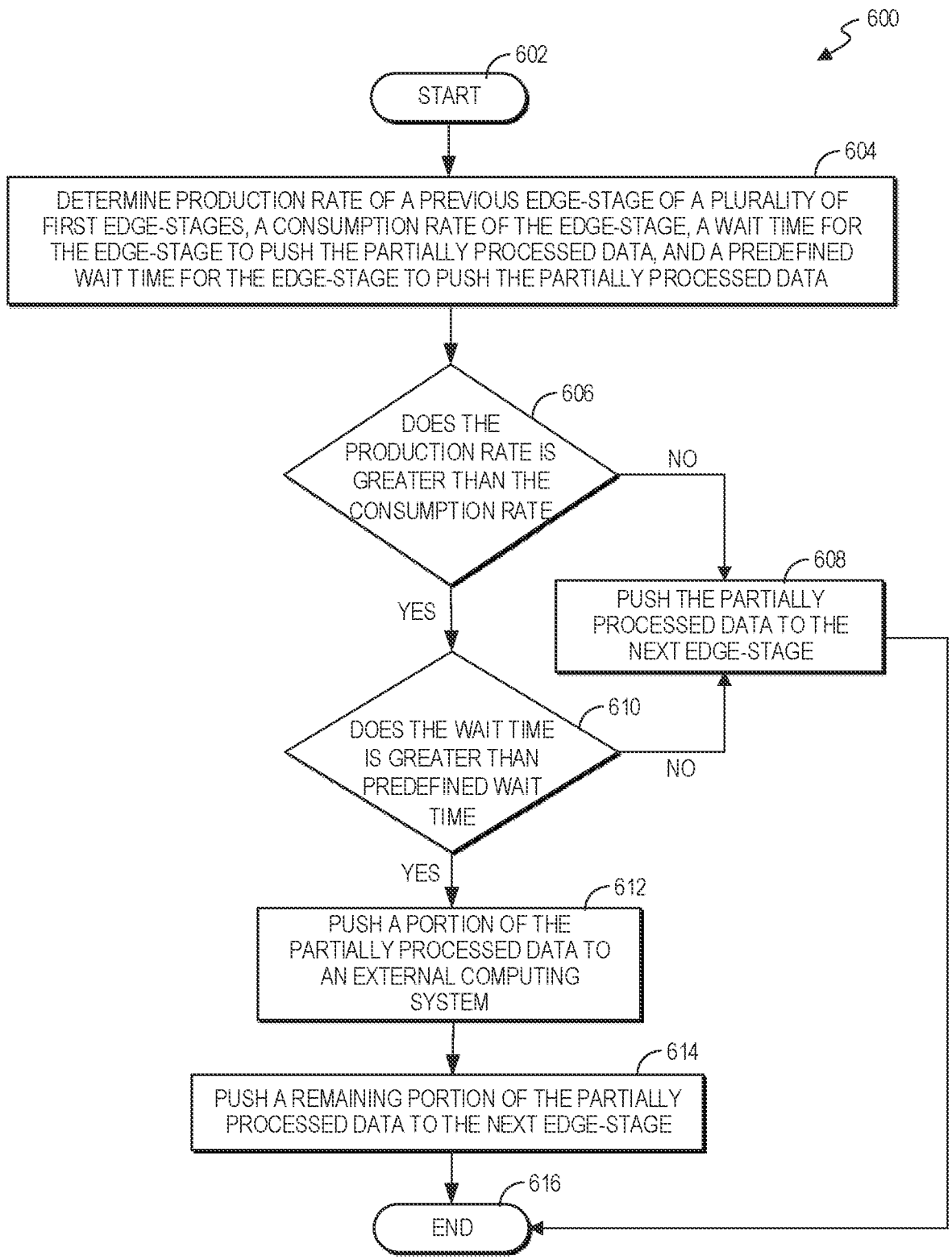
FIG. 6 is a flow diagram depicting an example method to determine a throughput of an edge-stage of a plurality of first edge-stages in a first computing system.

FIG. 6 is a flow diagram depicting an example method 600 to evaluate a data processing load at an edge-stage based on determining a throughput of the edge-stage in a first edge server 102, 202. It should be noted herein that the first edge servers 102, 202 referred to in FIG. 6 may be same or similar to first edge servers 102, 202 described in FIGS. 1-2. The method 600 is described in conjunction with the FIGS. 1-2 and FIG. 5. Specifically, the method 600 may represent various example sub-blocks of the block 508 described in FIG. 5. The method 600 starts at block 602 and continues to block 604. At block 604, the method 600 includes determining a plurality of parameters including a production rate of a previous edge-stage, a consumption rate of the current edge-stage, a wait time for the current edge-stage, and a predefined wait time for the current edge-stage, as described in the embodiment of FIGS. 1-2. The method 600 further continues to block 606. At block 606, if it is determined that the production rate of the previous edge-stage is not greater (i.e., lesser) than the consumption rate the current edge-stage ("NO" at block 606), the first edge servers 102, 202 may push the partially processed data to the next edge-stage at block 608. In such embodiments, the partially processed data is sequentially processed in the plurality of first edge-stages, until the data is completely processed, in the first edge servers 102, 202. However, at block 606, if it is determined that the production rate of the previous edge-stage is greater than the consumption rate the current edge-stage ("YES" at block 606), the first edge servers 102, 202 moves to block 610. At block 610, if it is determined that the wait time for the current edge-stage to push the partially processed data is not greater (i.e., lesser) than predefined wait time for the current edge-stage to push the partially processed data ("NO" at block 610), the first edge servers 102, 202 may push the partially processed data to the next edge-stage, at block 608. However, if it is determined that the wait time for the current edge-stage is greater than predefined wait time ("YES" at block 610), the first edge servers 102, 202 may move to block 612. In one or more embodiments, the predefined wait time may be dynamically modifiable by a user during setting up the first edge servers 102, 202. The method 600 further continues to a block 612. At block 612, the method 600 includes pushing a portion of the partially processed data to an external computing system, for example a data center 106 or a second edge server 203. These elements 106, 203 may be same or similar to elements 106, 203 described in FIGS. 1-2. The sequence of steps performed to process the portion of the partially processed in the data center 106 are described in the embodiment of FIG. 1. Similarly, sequence of steps performed to process the portion of the partially processed in the second edge server 203 are described in the embodiment of FIG. 2. The method 600 further continues to block 614. At step 614, the method 600 includes pushing a remaining portion of the partially processed data to the next edge-stage of the first edge servers 102, 202. The method 600 may further include repeating at each next edge-stage of the plurality of first edge-stages, the steps of evaluating the data processing load and pushing the partially processed data, until the data is completely processed. Once the first edge servers 102, 202 completely process the data in the plurality of first edge-stages, the method 600 ends at block 616.

FIG. 7 is a flow diagram depicting an example method 700 to evaluate a data processing load at an edge-stage based on determining a size of a data processing queue of a next edge-stage in a first edge servers 102, 202. It should be noted herein that the first edge servers 102, 202 referred to in FIG. 7 may be same or similar to first edge servers 102, 202 described in FIGS. 1-2. The method 700 is described in conjunction with the FIGS. 1-2, and FIG. 5. Specifically, the method 700 may represent various example sub-blocks of the block 508 described in FIG. 5. The method 700 starts at block 702 and continues to block 704. At block 704, the method 700 includes determining a plurality of parameters including a used size of the data processing queue (edge-queue) of the next edge-stage and a threshold size of the data processing queue of the next edge-stage, to push the partially processed data. The method 700 further continues to block 706. At block 706, if it is determined that the used size of the data processing queue of the next edge-stage is not greater (i.e., lesser) than the threshold size of the data processing queue of the next edge-stage ("NO" at block 706), the first edge servers 102, 202 may push the partially processed data to the next edge-stage, at block 708. In such embodiments, the partially processed data is sequentially processed in the plurality of first edge-stages, until the data is completely processed, in the first edge servers 102, 202. However, at block 706, if it is determined that the used size of the data processing queue of the next edge-stage is greater than the threshold size of the data processing queue of the next edge-stage ("YES" at block 706), the first edge servers 102, 202 moves to block 710. In one or more embodiments, the threshold size is dynamically determined for each edge-stage of the plurality of first edge-stages, based on a production rate of a previous edge-stage of a plurality of first edge-stages, a consumption rate of the edge-stage of the plurality of first edge-stages, the size of the data processing queue of the edge-stage of the plurality of first edge-stages, and a size of the data processing queue of the next edge-stage of the plurality of first edge-stages. The method 700 further continues to block 710. At block 710, the method 700 includes pushing a portion of the partially processed data to an external computing system, for example, a data center 106 or a second edge server 203. These elements 106, 203 may be same or similar to elements 106, 203 described in FIGS. 1-2. The sequence of steps performed to process the portion of the partially processed in the data center 106 are discussed in the embodiment of FIG. 1. Similarly, the sequence of steps performed to process the portion of the partially processed in the second edge server 203 are described in the embodiment of FIG. 2. The method 700 further continues to block 712. At step 712, the method 700 includes pushing a remaining portion of the partially processed data to the next edge-stage of the first edge servers 102, 202. The method 700 may further include repeating at each next edge-stage, the steps of evaluating the data processing load and pushing the partially processed data, until the data is completely processed. Once the first edge servers 102, 202 completely process the data in the plurality of first edge-stages, the method 700 ends at block 714.

FIG. 8 is a flow diagram depicting an example method 800 to evaluate a size of the data processing queue (edge-queue) of a first edge-stage in a first edge server 102. It should be noted herein that the first edge server 102 referred to in FIG. 8 may be same or similar to first edge server 102 described in FIG. 1. The method 800 is described in conjunction with the FIG. 1. The method 800 starts at block 802 and continues to block 804. At block 804, the method 800 includes determining a plurality of parameter including a used size of the data processing queue of a first edge-stage and a threshold size of the data processing queue of the first edge-stage. In one or more embodiments, the threshold size of the data processing queue is dynamically determined based on a production rate of the IoT data, a consumption rate of the first edge-stage, the size of the data processing queue of the first edge-stage, and a size of the data processing queue of the next edge-stage. The method 800 further continues to block 806. If it is determined that the used size of the data processing queue of the first edge-stage is greater than the threshold size of the data processing queue of the first edge-stage of the plurality of first edge-stages ("YES" at block 806), the first edge server 102 may push a portion of the unprocessed data to an external computing system, for example, a data center 106, at block 808. This data center 106 may be same or similar to element 106 described in FIG. 1. In such example embodiment, the data center 106 may sequentially process the unprocessed data in a plurality of cloud-stages, as discussed in the embodiment of FIG. 1. However, if it is determined that the used size of the data processing queue of the first edge-stage is not greater than the threshold size of the data processing queue of the first edge-stage ("NO" at block 816), the first edge server 102 may push the data to the first edge-stage to sequentially process the data in the first edge server 102, at block 810. The method 800 may further include performing the steps, described in conjunction with FIG. 1 and FIGS. 6-7, until the data is completely processed. The method 800 ends at block 812.

FIG. 9 is a flow diagram depicting an example method 900 to process a portion of the processed data in a second computing system, for example, a second edge server 203. It should be noted herein that the second edge server 203 referred to in FIG. 9 may be same or similar to second edge server 203 described in FIG. 2. The method 900 is described in conjunction with the FIG. 2 and FIGS. 5-7. Specifically, the method 900 may represent various example sub-blocks of the block 510 of FIG. 5, the block 612 of FIG. 6, and the block 710 of FIG. 7. The method 900 starts at block 902 and continues to block 904. At block 904, the method 900 includes obtaining a request from a first edge server 202 to process the portion of the partially processed data. It should be noted herein that the first edge server 202 referred to in FIG. 9 may be same or similar to first edge server 202 described in FIG. 2. The method 900 further continues to block 906. At block 906, a data processing load at an edge-stage of a plurality of second edge-stages is determined based on a throughput of the edge-stage of the plurality of second edge-stages or a size of a data processing queue of a next edge-stage of the plurality of second edge-stages, as discussed in the embodiment of FIG. 2. In some example embodiments, if it is determined that the data processing load at the edge-stage of the plurality of second edge-stages is greater, as discussed in the embodiments of FIGS. 2, 6, and 7 ("YES" at block 906), the second edge server 203 may reject the request to process the portion of the partially processed data to the first edge server 202. However, if it is determined that the data processing load at the edge-stage of the plurality of second edge-stages is not greater (i.e., lesser), as discussed in the embodiments of FIGS. 2, 6, and 7 ("NO" at block 906), the second edge server 203 may accept the request to process the portion of the partially processed data from the first edge server 202, at block 910 and collect the portion of the partially processed data from the first edge server 202, at block 912. The method 900 further continues to block 914. At step 914, the method 900 includes processing the portion of the partially processed data sequentially in the plurality of second edge-stages, until the data is completely processed. Once the second edge server 203 completely process the data in the plurality of second edge-stages, the method 900 ends at block 916.

In accordance with one or more embodiments, an edge server having data queueing and processing framework (i.e., in a form of a plurality of edge-queues and a plurality of edge-stages,) as discussed herein facilitates, the edge sever to quickly evaluate data processing load at each edge-stage and push a portion of partially processed data to external computing system, thereby combatting computational latency issue related to processing the data.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A method comprising:
    collecting, by a first processing resource of a first edge server, data from a plurality of smart devices;
    processing, by the first processing resource, a portion of the data at a given first edge-stage of a plurality of first edge-stages of the first edge server to generate partially processed data, wherein the plurality of first edge-stages is associated with a sequential processing order that designates the given first edge-stage of the plurality of first edge-stages to perform processing of the portion of the data before a next first edge-stage of the plurality of first edge-stages;
    evaluating, by the first processing resource, a data processing load at the given first edge-stage based on a throughput of the given first edge-stage or a size of a data processing queue of the next first edge-stage; and
    pushing, by the first processing resource, i) the partially processed data to the next first edge-stage or ii) a portion of the partially processed data to a computer system other than the first edge server and a remaining portion of the partially processed data to the next first edge-stage, based on the data processing load at the given first edge-stage.

2. The method of claim 1, further comprising repeating, at each first edge-stage of the other first edge-stages of the plurality of first edge-stages, the evaluating gf the data processing load and the pushing of the processed data.

3. The method of claim 1, further comprising determining, the throughput based on a production rate of another first edge-stage of the plurality of first edge-stages, a consumption rate of the given first edge-stage, a wait time for the given first edge-stage to push the partially processed data, and a predefined wait time for the given first edge-stage to push the partially processed data.

4. The method of claim 1, further comprising determining the size of the data processing queue based on a used size of the data processing queue and a threshold size of the data processing queue.

5. The method of claim 4, further comprising dynamically determining the threshold size based on a production rate of a previous first edge-stage of the plurality of first edge-stages that precedes the given first edge-stage according to the sequential processing order, a consumption rate of the given first edge-stage, and the size of the data processing queue.

6. The method of claim 1, wherein the computer system corresponds to a data center, and pushing of the portion of the partially processed data to the computer system comprises:
    collecting, by a second processing resource of the data center, the portion of the partially processed data in a cloud-stage of a plurality of cloud-stages; and
    processing, by the second processing resource, the portion of the partially processed data sequentially in the plurality of cloud-stages.

7. The method of claim 1, wherein the computer system comprises a second edge server, and pushing the portion of the partially processed data to the computer system comprises:
    obtaining, by a second processing resource of the second edge server, a request from the first processing resource to process the portion of the partially processed data;
    evaluating, by the second processing resource, a data processing load at an edge-stage of a plurality of second edge-stages based on a throughput of the second edge-stage of the plurality of second edge-stages or a size of a data processing queue of a next second edge-stage of the plurality of second edge-stages;
    collecting, by the second processing resource, the portion of the partially processed data from the first processing resource, based on the data processing load at the second edge-stage of the plurality of second edge-stages; and processing, by the second processing resource, the portion of the partially processed data sequentially in the plurality of second edge-stages.

8. The method of claim 1, wherein collecting data from the plurality of smart devices comprises collecting the data in a data processing queue of a first edge-stage of the plurality of first edge-stages.

9. The method of claim 1, further comprising:
evaluating the size of the data processing queue based on a used size of the data processing queue and a threshold size of the data processing queue.

10. The method of claim 1, wherein processing the data comprises performing one or more of an extraction, transformation, or loading of the data at each first edge-stage of the plurality of first edge-stages.

11. A first edge server comprising:
a plurality of first edge-stages, wherein the plurality of first edge-stages is associated with a sequential processing order that designates a given first edge-stage of the plurality of first edge-stages to perform processing of a portion of data before a next first edge-stage of the plurality of first edge-stages processes the portion of the data;
a first machine readable medium storing program instructions; and
a first processing resource operably coupled to the first machine readable medium, wherein the first processing resource executes the program instructions to:
collect data from a plurality of smart devices, wherein the data comprises the portion of the data;
process the portion of the data at the given first edge-stage to generate partially processed data;
evaluate a data processing load at the given first edge-stage based on a throughput of the given first edge-stage or a size of a data processing queue of the next first edge-stage; and
push i) the partially processed data to the next first edge-stage or ii) a portion of the partially processed data to a computer system other than the first edge server and a remaining portion of the partially processed data to the next first edge-stage, based on the data processing load at the first edge-stage.

12. The first edge server of claim 11, wherein the second computer system corresponds to a data center, and the data center comprises a second machine readable medium storing program instructions, and a processor operably coupled to the second machine readable medium, and wherein the processor executes the program instructions stored on the second machine readable medium to:
collect the portion of the partially processed data in a cloud-stage of a plurality of cloud-stages; and
process the portion of the partially processed data sequentially in the plurality of cloud-stages.

13. The first edge server of claim 11, wherein the second computer system comprises a second edge server, wherein the second edge server comprises a second machine readable medium storing program instructions, and a second processing resource operably coupled to the second machine readable medium, and wherein the second processing resource executes the program instructions stored on the second machine readable medium to:
obtain a request from the first processing resource to process the portion of the partially processed data;
evaluate a data processing load at a given second edge-stage of a plurality of second edge-stages based on a throughput of the given second edge-stage or a size of a data processing queue of a next second edge-stage of the plurality of second edge-stages;
collect the portion of the partially processed data from the first processing resource, based on the data processing load; and
process the portion of the partially processed data sequentially in the plurality of second edge-stages.

14. The first edge server of claim 11, wherein the first processing resource further executes the program instructions to repeat at each next first edge-stage of the plurality of first edge-stages, the evaluation of the data processing load and the pushing gf the processed data.

15. The first edge server of claim 11, wherein the first processing resource further executes the program instructions to determine the throughput based on a production rate of a previous first edge-stage of the plurality of first edge-stages, a consumption rate of the given first edge-stage, a wait time for the given first edge-stage to push the partially processed data, and a predefined wait time for the given first edge-stage to push the partially processed data.

16. The first edge server of claim 11, wherein the first processing resource further executes the program instructions to determine the size of the data processing queue based on a used size of the data processing queue and a threshold size of the data processing queue.

17. The first edge server of claim 11, wherein the first processing resource further executes the program instructions to dynamically determine, for the given first edge-stage, based on a production rate of a previous first edge-stage of the plurality of first edge-stages, a consumption rate of the given first edge-stage, the size of the data processing queue and a size of the data processing queue of the next first edge-stage.

18. A non-transitory machine readable medium storing instructions executable by a first processing resource f a first edge server, the instructions comprising:
instructions to collect data from a plurality of smart devices;
instructions to process a portion of the data at a given first edge-stage of a plurality of first edge-stages to generate partially processed data, wherein the plurality of first edge-stages is associated with a sequential processing order that designates the given first edge-stage of the plurality of first edge-stages to perform processing of the portion of the data before a next first edge-stage of the plurality of first edge-stages;
instructions to evaluate a data processing load at the given first edge-stage based on a throughput of the given first edge-stage or a size of a data processing queue of the next first edge-stage; and
instructions to push i) the partially processed data to the next first edge-stage or ii) a portion of the partially processed data to a computer system other than the first edge server and a remaining portion of the partially processed data to the next first edge-stage, based on the data processing load at the first edge-stage.

19. The non-transitory machine readable medium of claim 18, wherein the computer system corresponds to a data center, and wherein the instructions to push the portion of the partially processed data to the computer system comprises instructions to:
collect, by a processor of the data center, the portion of the partially processed data in a cloud-stage of a plurality of cloud-stages; and process, by the processor, the portion of the partially processed data sequentially in the plurality of cloud-stages.

20. The non-transitory machine readable medium of claim 18, wherein the computer system comprises a second edge server, and wherein the instructions to push the portion of the partially processed data to the computer system comprises instructions to:
- obtain, by a second processing resource of the second edge server, a request from the first processing resource to process the portion of the partially processed data;
- evaluate, by the second processing resource, a data processing load at a given second edge-stage of a plurality of second edge-stages based on a throughput of the given second edge-stage or a size of a data processing queue of a next second edge-stage of the plurality of second edge-stages;
- collect, by the second processing resource, the portion of the partially processed data from the first processing resource, based on the data processing load at the given second edge-stage; and
- process, by the second processing resource, the portion of the partially processed data sequentially in the plurality of second edge-stages.

* * * * *